(12) United States Patent
Sato et al.

(10) Patent No.: US 8,705,629 B2
(45) Date of Patent: Apr. 22, 2014

(54) IMAGE INFORMATION ENCODING METHOD AND ENCODER, AND IMAGE INFORMATION DECODING METHOD AND DECODER

(71) Applicant: Sony Corporation, Tokyo (JP)

(72) Inventors: Kazushi Sato, Chiba (JP); Osamu Sunohara, Tokyo (JP); Teruhiko Suzuki, Chiba (JP); Peter Kuhn, Tokyo (JP); Yoichi Yagasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/078,096

(22) Filed: Nov. 12, 2013

(65) Prior Publication Data

US 2014/0064378 A1    Mar. 6, 2014

Related U.S. Application Data

(63) Continuation of application No. 13/489,089, filed on Jun. 5, 2012, which is a continuation of application No. 12/340,283, filed on Dec. 19, 2008, now Pat. No. 8,275,043, which is a continuation of application No. 10/466,320, filed as application No. PCT/JP02/12562 on Nov. 29, 2002, now Pat. No. 7,639,742.

(30) Foreign Application Priority Data

Nov. 30, 2001    (JP) .................................. 2001-367867

(51) Int. Cl.
    *H04N 7/12*    (2006.01)
(52) U.S. Cl.
    USPC ...................................... 375/240.16; 348/699
(58) Field of Classification Search
    None
    See application file for complete search history.

(56) References Cited

U.S. PATENT DOCUMENTS

| | | | |
|---|---|---|---|
| 4,862,267 A | 8/1989 | Gillard et al. | |
| 5,475,430 A | 12/1995 | Hamada et al. | |
| 5,650,824 A | 7/1997 | Huang | |

(Continued)

FOREIGN PATENT DOCUMENTS

| | | |
|---|---|---|
| JP | 6-335025 | 12/1994 |
| JP | 2000-333203 | 11/2000 |

OTHER PUBLICATIONS

Office Action mailed Jul. 18, 2012, in European Patent Application No. 02783717.8.

(Continued)

*Primary Examiner* — Christopher S Kelley
*Assistant Examiner* — Christopher Findley
(74) *Attorney, Agent, or Firm* — Oblon, Spivak, McClelland, Maier & Neustadt, L.L.P.

(57) ABSTRACT

An image decoding method includes decoding encoded image data to generate a decoded image signal including a luma signal and a chroma signal. The method further includes scaling, when a reference field has a different parity from a current field for motion compensation and when the decoded image signal is in a format in which the number of chroma pixels is vertically different from the number of luma pixels, a chroma motion vector of the chroma signal according to an accuracy for a luma motion vector of the luma signal so that a reference frame will coincide in phase of the chroma signal with a current frame. The method also includes performing motion compensation of the decoded image signal using the scaled chroma motion vector according to the accuracy of the luma motion vector of the luma signal.

10 Claims, 23 Drawing Sheets

(56) References Cited

U.S. PATENT DOCUMENTS

| | | | |
|---|---|---|---|
| 5,712,687 A | | 1/1998 | Naveen et al. |
| 5,798,792 A | * | 8/1998 | Kusaka et al. ............... 348/264 |
| 6,104,753 A | | 8/2000 | Kim et al. |
| 6,262,771 B1 | | 7/2001 | Higurashi et al. |
| 6,498,814 B1 | * | 12/2002 | Morel ..................... 375/240.12 |
| 6,584,154 B1 | * | 6/2003 | Wu .......................... 375/240.16 |
| 7,197,194 B1 | | 3/2007 | Ratcliffe |

OTHER PUBLICATIONS

Summons to Attend Oral Proceedings received in corresponding European Application No. 11164459.7 on Mar. 1, 2013.
Extended Search Report issued Jul. 27, 2011 in European Application No. 11164405.0.
"ITU-T Recommendation H.262, International Standard ISO/IEC 13818.2 MPEG-2 Video, Transmission of Non-Telephone Signals, Information Technology—Generic Coding of Moving Pictures and Associated Audio Information: Video," ITU-T Telecommunication Standaradization Sector of ITU, XP000198491, pp. 1-211, Jul. 1, 1995.
Gary Sullivan, et al., "Detailed Algorithm Technical Description for ITU-T VCEG Draft H.26L Algorithm in Response to Video and DCinema CfPs", Joint Video Team, International Organisation for Standardisation, ISO/IEC JTC1/SC29/WG11, MPEG2001/M7512, ITU-T VCEG (Q.6/16), XP03036619, pp. 1-46, Jul. 10, 2001.
Peter Borgwardt, "Core Experiment on Interlaced Video Coding", Joint Video Team, ITU-Telecommunications Standardization Sector, Study Group 16 Question 6, Video Coding Experts Group (VCEG), VCEG-N85r1, XP030003332, pp. 1-10, Nov. 26, 2001.
"Proposal Package Description for MPEG Phase 2", "Algorithm proposals", Joint Video Team, International Organization for Standardization, ISO-IEC/JTC1/SC2/WG 11, MPEG91/ 223,255, AVC-159, XP030000151, pp. 1-55, Nov. 1991.
Kazushi Sato, et al., "Core Experiment on Interlace Chroma Phase Shift", Joint Video Team (JVT) of ISO/IEC MPEG & ITU-T VCEG, JVT-B116, XP040418017, pp. 1-12, Jan. 29, 2002.
Kazushi Sato, et al., "New Interlace Coding Tools", Joint Video Team (JVT) of ISO/IEC MPEG & ITU-T VCEG, JVT-B068, XP040417957, pp. 1-13, Jan. 29, 2009.
Office Action issued on Nov. 7, 2013 in related European Patent Application No. 11164433.2.
Office Action issued on Nov. 7, 2013 in related European Patent Application No. 11164454.8.
Office Action issued on Nov. 7, 2013 in related European Patent Application No. 11164462.1.
Office Action issued on Nov. 7, 2013 in related European Patent Application No. 11164442.3.
Office Action issued on Nov. 7, 2013 in related European Patent Application No. 11164449.8.
Office Action issued on Nov. 7, 2013 in related European Patent Application No. 11164458.9.

* cited by examiner

IMAGE INFORMATION ENCODING METHOD AND ENCODER, AND IMAGE INFORMATION DECODING METHOD AND DECODER

CROSS-REFERENCE TO RELATED APPLICATIONS

This application is a continuation of U.S. Ser. No. 13/489,089 filed Jun. 5, 2012, which is a continuation of, and claims the benefit of priority under 35 U.S.C. §120 from, U.S. Ser. No. 12/340,283 filed Dec. 19, 2008 (now U.S. Pat. No. 8,275,043), which is a continuation of, and claims the benefit of priority under 35 U.S.C. §120 from, U.S. Ser. No. 10/466,320 filed Nov. 19, 2003 (now U.S. Pat. No. 7,639,742 issued Dec. 29, 2009), and is based upon, and claims the benefit of priority from, PCT Application No. PCT/JP02/12562 filed Nov. 29, 2002, and is further based upon, and claims the benefit of priority under 35 U.S.C. §119 from, Japanese Patent Application No. 2001-367867 filed Nov. 30, 2001, the entirety of each of which are incorporated by reference herein.

TECHNICAL FIELD

The present invention relates to an image information encoding apparatus and method, image information decoding apparatus and method, and an image information encoding/decoding program, used when receiving image information (bit stream) compressed by an orthogonal transform such as discrete cosine transform (DCT) and a motion compensation as in MPEG (Moving Pictures Experts Group), H.26X or the like via a network medium such as a broadcasting satellite, cable TV or Internet, or when manipulating such image information in a storage medium such as an optical disc, magnetic disc, flash memory or the like.

BACKGROUND ART

Recently, there has been more widely used in both the information distribution from a broadcast station and information reception at the general household an apparatus complying with MPEG or the like and in which image information is manipulated in the form of digital data by compressing the image information by an orthogonal transform such as DCT and a motion compensation through the use of the redundancy unique in order to the image information to attain a high efficiency of transmission and storage of the image information.

Among others, MPEG-2 (IS/IEC 13818-2) is well known as a versatile image encoding system applicable to both an interlaced image and sequentially-scanned image, as well as to a standard-resolution image and high-definition image. It will continuously be used widely in both professional and consumer applications. Using the MPEG-2 compression system, it is possible to implement a high data compression ratio and image quality by allocating a bit rate of 4 to 8 Mbps to a standard-resolution interlaced image including 720×480 pixels for example, and a bit rate of 18 to 22 Mbps to a high-definition interlaced image including 1920×1088 pixels.

MPEG-2 is intended primarily for a high image-quality encoding addressed to the broadcasting, but it did not support any lower bit rate than that in MPEG-1, namely, any encoding at a higher compression rate. As the mobile terminals have become widely used, however, it is believed that the high image-quality encoding for the broadcasting, for which MPEG-2 is intended, will be demanded more and more. In these circumstances, the MPEG-4 encoding system was standardized. For the image encoding, the MPEG-4 was approved as an international standard ISO/IEC 14496-2 in December, 1998.

Recently, H.26L (ITU-T Q6/16 VCEG) is under standardization for an initial purpose of teleconference-oriented image encoding. This H.26L is known for attaining a high efficiency of encoding as compared with the conventional encoding system such as MPEG-2 and MPEG-4 although it requires many operations for encoding and decoding of image information. A system based on H.26L and covering functions not supported by H.26L is under standardization as "Joint Model of Enhanced-Compression Video Coding" for a higher efficiency of encoding. This standardization is a part of the MPEG-4 activities.

FIG. 1 schematically illustrates the construction of a conventional image information encoder which compresses an image by an orthogonal transform such as DCT (discrete cosine transform) or Karhunen-Loeve transform (KLT) and a motion compensation. The image information encoder is generally indicated with a reference 100. As shown in FIG. 1, the image information encoder 100 includes an A-D (analog-digital) converter 101, frame rearrange buffer 102, adder 103, orthogonal transform unit 104, quantizer 105, reversible encoder 106, storage buffer 107, dequantizer 108, inverse orthogonal transform unit 109, frame memory 110, motion estimate/compensate unit 111, and a rate controller 112.

As shown in FIG. 1, the A-D converter 101 converts an input image signal into a digital signal. The frame rearrange buffer 102 rearranges a frame correspondingly to the GOP (group of pictures) configuration of compressed image information output from the image information encoder 100. At this time, for a picture to be intra-frame encoded, the frame rearrange buffer 102 will supply image information on the entire frame to the orthogonal transform unit 104. The orthogonal transform unit 104 makes orthogonal transform such as DCT (discrete cosine transform) or Karhunen-Loeve transform (KLT) of the image information and supply a conversion factor to the quantizer 105. The quantizer 105 quantizes the conversion factor supplied from the orthogonal transform unit 104.

The reversible encoder 106 makes reversible encoding, such as variable-length encoding or arithmetic encoding, of the quantized conversion factor, and supplies the encoded conversion factor to the storage buffer 107 where the conversion factor will be stored. The encoded conversion factor is provided as compressed image information.

The behavior of the quantizer 105 is controlled by the rate controller 112. Also, the quantizer 105 supplies the quantized conversion factor to the dequantizer 108 which will dequantize the supplied conversion factor. The inverse orthogonal transform unit 109 makes inverse orthogonal transform of the dequantized conversion factor to generate decoded image information and supply the information to the frame memory 110.

On the other hand, for a picture to be inter-frame encoded, the frame rearrange buffer 102 will supply image information to the motion estimate/compensate unit 111. At the same time, the motion estimate/compensate unit 111 takes out reference image information from the frame memory 110, and makes motion-estimation/compensation of the information to generate reference image information. The motion estimate/compensate unit 111 supplies the reference image information to the adder 103 which will convert the reference image information into a signal indicative of a difference of the reference image information from the original image information. Also, at the same time, the motion estimate/compensate unit 111 supplies motion vector information to the reversible encoder 106.

The reversible encoder 106 makes reversible encoding, such as variable-length encoding or arithmetic encoding, of the motion vector information to form information which is to be inserted into a header of the compressed image information. It should be noted that the other processes are the same as for image information which is to be intra-frame encoded, and so will not be described any longer herein.

FIG. 2 schematically illustrates the construction of a conventional image information decoder corresponding to the aforementioned image information encoder 100. The image information decoder is generally indicated with a reference 120. As shown in FIG. 2, the image information decoder 120 includes a storage buffer 121, reversible decoder 122, dequantizer 123, inverse orthogonal transform unit 124, adder 125, frame rearrange buffer 126, D-A converter 127, motion estimate/compensate unit 128, and a frame memory 129.

As shown in FIG. 2, the storage buffer 121 provisionally stores input compressed image information, and then transfers it to the reversible decoder 122. The reversible decoder 122 makes variable-length decoding or arithmetic decoding of the compressed image information on the basis of a predetermined compressed image information format, and supplies the quantized conversion factor to the dequantizer 123. Also, when the frame is a one having been inter-frame encoded, the reversible decoder 122 will decode motion vector information inserted in a header of the compressed image information as well and supplies the information to the motion estimate/compensate unit 128.

The dequantizer 123 dequantizes the quantized conversion factor supplied from the reversible decoder 122, and supplies the conversion factor to the inverse orthogonal transform unit 124. The inverse orthogonal transform unit 124 will make inverse discrete cosine transform (inverse DCT) or inverse orthogonal transform such as inverse Karhunen-Loeve transform (inverse KLT) of the conversion factor on the basis of the predetermined compressed image information format.

Note that in case the frame is a one having been intra-frame encoded, the inversely orthogonal-transformed image information will be stored into the frame rearrange buffer 126, subjected to D/A conversion in the D-A converter 127, and then outputted.

On the other hand, in case the frame is a one having been inter-framed encoded, reference image will be generated based on motion vector information having been reversibly decoded and image information stored in the frame memory 129, and the reference image and output from the inverse orthogonal transform unit 124 be combined together in the adder 125. It should be noted that the other processes are the same as for the intra-frame coded frame and so will not be described any longer.

Note that as the color information format of a picture signal, the YUV format is widely used and MPEG-2 supports the 4:2:0 format. FIG. 3 shows the relation in phase between brightness and color-difference signals when the picture signal relates to an interlaced image. As shown in FIG. 3, MPGE2 defines that in a first field, a color-difference signal should exist in a quarter of one phase covering the sampling period of a brightness signal and in a second field, it should exist in three fourths of the phase.

In MPEG-2, there are defined two motion estimate/compensate modes: a field motion estimate/compensate mode and frame motion estimate/compensate mode. These modes will be described herebelow with reference to the accompanying drawings.

A frame motion estimate/compensate mode is shown in FIG. 4. The frame motion estimate/compensate mode is intended to make a motion estimation and compensation of a frame formed from two interlaced fields. A brightness signal is predicted for each block of interlaced 16 pixels by 16 lines. FIG. 4 shows an example of a forward estimation and compensation of a motion of an object frame from a reference frame one frame apart from the object frame. This frame motion estimation and compensation is effective for a frame moving at a relatively slow, equal speed with the intra-frame correlation remaining high.

A field motion estimate/compensate mode is shown in FIG. 5. This field motion estimate/compensate mode is intended to make motion compensation of each field. As shown in FIG. 5, the field motion is estimated using a motion vector $mv_1$ for the first field, and using a motion vector $mv_2$ for the second field.

Also, a reference field may be the first field and it is set with a motion vertical field select flag in a macro block data. As shown in FIG. 5, the first field is used as the reference field for both the first and second fields. With this field motion estimate/compensate mode, the field motion is estimated for each field in the macro block, and so a brightness signal will be predicted in units of a field block of 16 pixels by 8 lines.

Note that for a P-picture (predictive-coded picture) or unidirectional predicted B-picture (bidirectionally predictive-coded picture), two pieces of motion vector information are required per macro block. Also, for bidirectional prediction encoded B-picture, four pieces of motion vector information are required per macro block. Therefore, the field motion estimate/compensate mode permits to estimate a local motion and accelerative motion with an improved efficiency of estimation by estimating the motion of each field, but since it requires a double amount of motion vector information as compared with that in the frame motion estimate/compensate mode, its overall efficiency of encoding will possibly be lower.

According to H.26L, a motion is estimated and compensated on the basis of a variable block size to attain a high efficiency of encoding. According to the current H26.L, a sequentially scanned picture is taken as an input. At present, however, there is a movement to extend the current H.26L so that interlaced picture can be manipulated. For example, the "Core Experiment on Interlaced Video Coding" (VCEG-N85, ITU-T) defines twenty types of block sizes as shown in FIG. 6 for an interlaced picture.

Further, H.26L defines a motion estimation and compensation with an accuracy as high as ¼ or ⅛ pixel. Currently, however, this standard defines a motion estimation and compensation only for a sequentially scanned picture.

The motion estimation and compensation with the ¼-pixel accuracy defined in H.26L is shown in FIG. 7. To produce a picture estimated with the ¼-pixel accuracy, a pixel value with a ½-pixel accuracy is first produced based on the pixel value stored in the frame memory and using a 6-tap FIR filter for each of the horizontal and vertical directions. It should be noted that an FIR filter coefficient is determined as given by the following equation (1):

$$\{I,-5,20,20,-5,1\}/32 \qquad (1).$$

Then, a picture estimated with a ¼-pixel accuracy is produced based on the picture estimated with the ½-pixel accuracy produced as above and by linear interpolation.

Also, H.26L defines a filter bank given by the following expression (2) for estimation and compensation of a motion with a 1/8-pixel accuracy.

$$1:1$$
$$1/8:\{-3,-12,-37,485,71,-21,6,-1\}/512$$
$$2/8:\{-3,-12,-37,229,71,-21,6,-1\}/256$$
$$3/8:\{-6,-24,-76,387,229,-60,18,-4\}/512$$
$$4/8:\{-3,-12,-39,158,158,-39,12,-3\}/256$$
$$5/8:\{-4,18,-60,229,387,76,24,-6\}/512$$
$$6/8:\{-1,6,-21,71,229,-37,12,-3\}/256$$
$$7/8:\{-1,6,-21,71,485,-37,12,-3\}/512 \qquad (2).$$

FIG. 8 shows the relation in phase between the brightness signal and color-difference signal when in MPEG-2-based compressed image information, the macro block is in the frame motion estimate/compensate mode and motion-vector vertical component has a value of 1.0. As shown in FIG. 8, the color-difference signal should be such that each pixel exists in a phase defined by a triangle but it actually exists in a phase indicate with a square. This problem will also take place when the value of motion-vector vertical component is . . . , −3.0, 5.0, 9.0, . . . , namely, when it is 4n+1.0 (n is an integer).

FIG. 9 shows the relation in phase between the brightness signal and color-difference signal when in MPEG-2-based compressed image information, the macro block is in the field motion estimate/compensate mode and motion-vector vertical component has a value of 2.0. As shown in FIG. 9, the color-difference signal should be such that each pixel exists in a phase defined by a triangle but it actually exists in a phase defined by a square. This problem will also take place when the value of motion-vector vertical component is ±2.0, ±6.0, ±10.0, . . . , namely, when it is 4n+2.0 (n is an integer).

When the problem as shown in FIG. 9 takes place, reference will be made to a field for the color-difference signal and to a different field for the brightness signal. So, the image quality will be considerably degraded. Such a problem will not cause such a considerable image quality degradation in the MPEG-2-based picture encoding system in which motion estimation and compensation with an accuracy of down to ½ pixel is allowed. In the picture encoding system based on MPEG-4 or H.26L, however, since motion estimation and compensation with an accuracy of down to ¼ pixel or ⅛ pixel, respectively, is allowed, the problem will possibly be an important cause of image quality degradation.

Such a problem takes place when the macro block is in the frame motion estimate/compensate mode as well as in the field estimate mode, and it also takes place when motion compensation is done with a variable block size as shown in FIG. 6.

DISCLOSURE OF THE INVENTION

Accordingly, the present invention has an object to overcome the above-mentioned drawbacks of the related art by providing an image information encoding apparatus and method, image information decoding apparatus and method, and an image information encoding/decoding program, capable of correcting a phase shift of a color-difference signal, caused by a motion estimation and compensation, when an input signal is an interlaced signal, to improve the quality of output image of compressed image information.

The above object can be attained by providing an image information encoding method in which image information is compression-encoded by breaking an input image signal including a brightness signal and color-difference signal into blocks and making motion estimation and compensation of the input image signal in units of a block, the method including the step of shifting, for motion estimation and compensation, the phase of the color-difference signal in a reference image block adaptively to a selected motion estimate mode and the value my of vertical component in motion vector information so that the reference image block will coincide in phase of the color-difference signal with an input image block.

In the above method, the input image signal is an interlaced image in a format of 4:2:0, and the motion estimate mode includes a frame motion estimate/compensate mode and field motion estimate/compensate mode, either of which is selected for each macro block as an encoding unit including the blocks.

For the motion estimation/compensation in this image information encoding method, the color-difference signal in the reference image block is so phase-shifted adaptively to a selected motion estimate mode and the value my of vertical component in motion vector information so that the reference image block will be in phase of the color-difference signal with the input image block, thereby avoiding a degradation in image quality of the color-difference signal, caused by a phase shift or field reverse.

Also the above object can be attained by providing an image information encoder in which image information is compression-encoded by breaking an input image signal including a brightness signal and color-difference signal into blocks and making motion estimation and compensation of the input image signal in units of a block, the apparatus including a phase correction means which shifts, for motion estimation and compensation, the phase of the color-difference signal in a reference image block adaptively to a selected motion estimate mode and the value my of vertical component in motion vector information so that the reference image block will be in phase of the color-difference signal with an input image block.

In the above apparatus, the input image signal is an interlaced image in a format of 4:2:0, and the motion estimate mode includes a frame motion estimate/compensate mode and field motion estimate/compensate mode, either of which is selected for each macro block as an encoding unit including the blocks.

For the motion estimation/compensation in this image information encoder, the color-difference signal in the reference image block is phase-shifted adaptively to a selected motion estimate mode and the value my of the vertical component in motion vector information so that the reference image block will be in phase of the color difference signal with an input image block, thereby avoiding a degradation in image quality of the color-difference signal, caused by a phase shift or field reverse.

Also the above object can be attained by providing an image information decoding method in which decompression including motion compensation is made of a string of image compressed-codes by breaking an input image signal including a brightness signal and color-difference signal into blocks and making motion estimation and compensation of the input image signal in units of a block, the method including the step of shifting, for motion estimation and compensation, the phase of the color-difference signal in a reference image block adaptively to a selected motion estimate mode and the value my of vertical component in motion vector information so that the reference image block will be in phase of the color-difference signal with an input image block.

In the above method, the input image signal is an interlaced image in a format of 4:2:0, and the motion estimate mode includes a frame motion estimate/compensate mode and field motion estimate/compensate mode, either of which is selected for each macro block as an encoding unit including the blocks.

For the motion estimation/compensation in this image information decoding method, the color-difference signal in the reference image block is phase-shifted adaptively to a selected motion estimate mode and the value my of the vertical component in motion vector information so that the reference image block will be in phase of the color-difference signal with an input image block, thereby avoiding a degradation in image quality of the color-difference signal, caused by a phase shift or field reverse.

Also the above object can be attained by providing an image information decoder in which decompression including motion compensation is made of a string of image compressed-codes by breaking an input image signal including a brightness signal and color-difference signal into blocks and making motion estimation and compensation of the input image signal in units of a block, the apparatus including a phase shifting means for shifting, for motion estimation and compensation, the phase of the color-difference signal in a reference image block adaptively to a selected motion estimate mode and the value my of vertical component in motion vector information so that the reference image block will be in phase of the color-difference signal with an input image block.

In the above apparatus, the input image signal is an interlaced image in a format of 4:2:0, and the motion estimate mode includes a frame motion estimate/compensate mode and field motion estimate/compensate mode, either of which is selected for each macro block as an encoding unit including the blocks.

For the motion estimation/compensation in this image information decoder, the color-difference signal in the reference image block is phase-shifted adaptively to a selected motion estimate mode and the value my of the vertical component of the motion vector information so that the reference image block will be in phase of the color-difference signal with an input image block, thereby avoiding a degradation in image quality of the color-difference signal, caused by a phase shift or field reverse.

Also the above object can be attained by providing an image information compressing-encoding program in which image information is compression-encoded by breaking an input image signal including a brightness signal and color-difference signal into blocks and making motion estimation and compensation of the input image signal in units of a block, the program including the step of shifting, for motion estimation and compensation, the phase of the color-difference signal in a reference image block adaptively to a selected motion estimate mode and the value my of vertical component in motion vector information so that the reference image block will coincide in phase of the color-difference signal with an input image block.

In the above program, the input image signal is an interlaced image in a format of 4:2:0, and the motion estimate mode includes a frame motion estimate/compensate mode and field motion estimate/compensate mode, either of which is selected for each macro block as an encoding unit including the blocks.

For the motion estimation/compensation in this image information compression-encoding program, the color-difference signal in the reference image block is so phase-shifted adaptively to a selected motion estimate mode and the value my of vertical component of the motion vector information so that the reference image block will be in phase of the color-difference signal with the input image block, thereby avoiding a degradation in image quality of the color-difference signal, caused by a phase shift or field reverse.

These objects and other objects, features and advantages of the present invention will become more apparent from the following detailed description of the best mode for carrying out the present invention when taken in conjunction with the accompanying drawings.

BEST MODE FOR CARRYING OUT THE INVENTION

Embodiments of the present invention will be described herebelow with reference to the accompanying drawings. In the embodiments, the present invention is applied to an image information encoder which is supplied with an interlaced image in the format of 4:2:0 as input signal and compresses the image by an orthogonal transform and motion estimation and compensation, and to an image information decoder which decodes such compressed image information. In the image information encoder and decoder, a phase shift of a color-difference signal, caused by the motion estimation and compensation, is corrected to prevent the output compressed image information from being degraded in quality.

Figure 10:
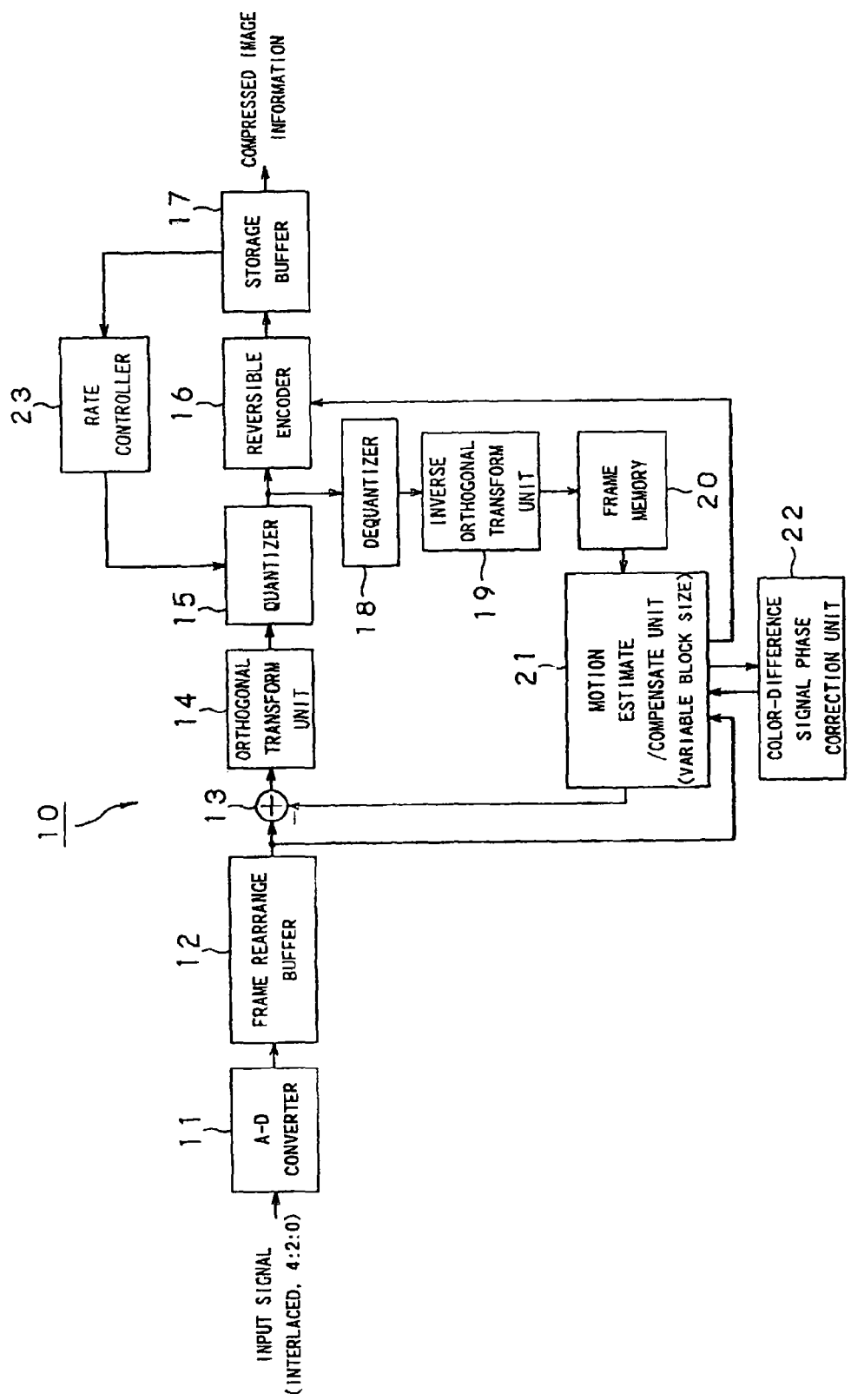
FIG. 10 schematically illustrates the construction of an image information encoder according to the present invention.

First, the construction of the image information encoder according to the present invention will be described with reference to FIG. 10. The image information encoder is generally indicated with a reference 10. As shown in FIG. 10, the image information encoder 10 includes an A-D (analog-digital) converter 11, frame rearrange buffer 12, adder 13, orthogonal transform unit 14, quantizer 15, reversible encoder 16, storage buffer 17, dequantizer 18, inverse orthogonal transform unit 19, frame memory 20, motion estimate/compensate unit (variable block size) 21, color-difference signal phase correction unit 22, and a rate controller 23.

As shown in FIG. 10, the A-D converter 11 is supplied with an image signal and converts the input image signal into a digital signal. Then, the frame rearrange buffer 21 rearranges a frame correspondingly to the GOP (group of pictures) configuration of compressed image information output from the image information encoder 10. At this time, for a picture to be intra-frame encoded, the frame rearrange buffer 12 will supply image information on the entire frame to the orthogonal transform unit 14. The orthogonal transform unit 14 makes orthogonal transform such as DCT (discrete cosine transform) or Karhunen-Loeve transform (KLT) of the image information and supply a conversion factor to the quantizer 15. The quantizer 15 quantizes the conversion factor supplied from the orthogonal transform unit 14.

The reversible encoder 16 makes reversible encoding, such as variable-length encoding or arithmetic encoding, of the quantized conversion factor, and supplies the encoded conversion factor to the storage buffer 17 where the conversion factor will be stored. The encoded conversion factor is provided as compressed image information.

The behavior of the quantizer 15 is controlled by the rate controller 23. Also, the quantizer 15 supplies the quantized conversion factor to the dequantizer 18 which will dequantize the supplied conversion factor. The inverse orthogonal transform unit 19 makes inverse orthogonal transform of the dequantized conversion factor to generate decoded image information and supply the information to the frame memory 20.

On the other hand, for a picture to be inter-frame encoded, the frame rearrange buffer 12 will supply image information to the motion estimate/compensate unit (variable block size) 21. At the same time, the motion estimate/compensate unit (variable block size) 21 takes out reference image information from the frame memory 20, and makes motion-estimation/compensation of the information while making phase correction of a color-difference signal in the color-difference signal phase correction unit 22 as will further be described later to generate reference image information.

The motion estimate/compensate unit 21 supplies the reference image information to the adder 13 which will convert the reference image information into a signal indicative of a difference of the reference image information from the original image information. Also, at the same time, the motion estimate/compensate unit 21 supplies motion vector information to the reversible encoder 16.

The reversible encoder 16 makes the reversible encoding, such as variable length encoding or arithmetic encoding, of the motion vector information to form information which is to be inselled into a header of the compressed image information. It should be noted that the other processes are the same as for image information which is to be intra-frame encoded, and so will not be described any longer herein.

Figure 11:
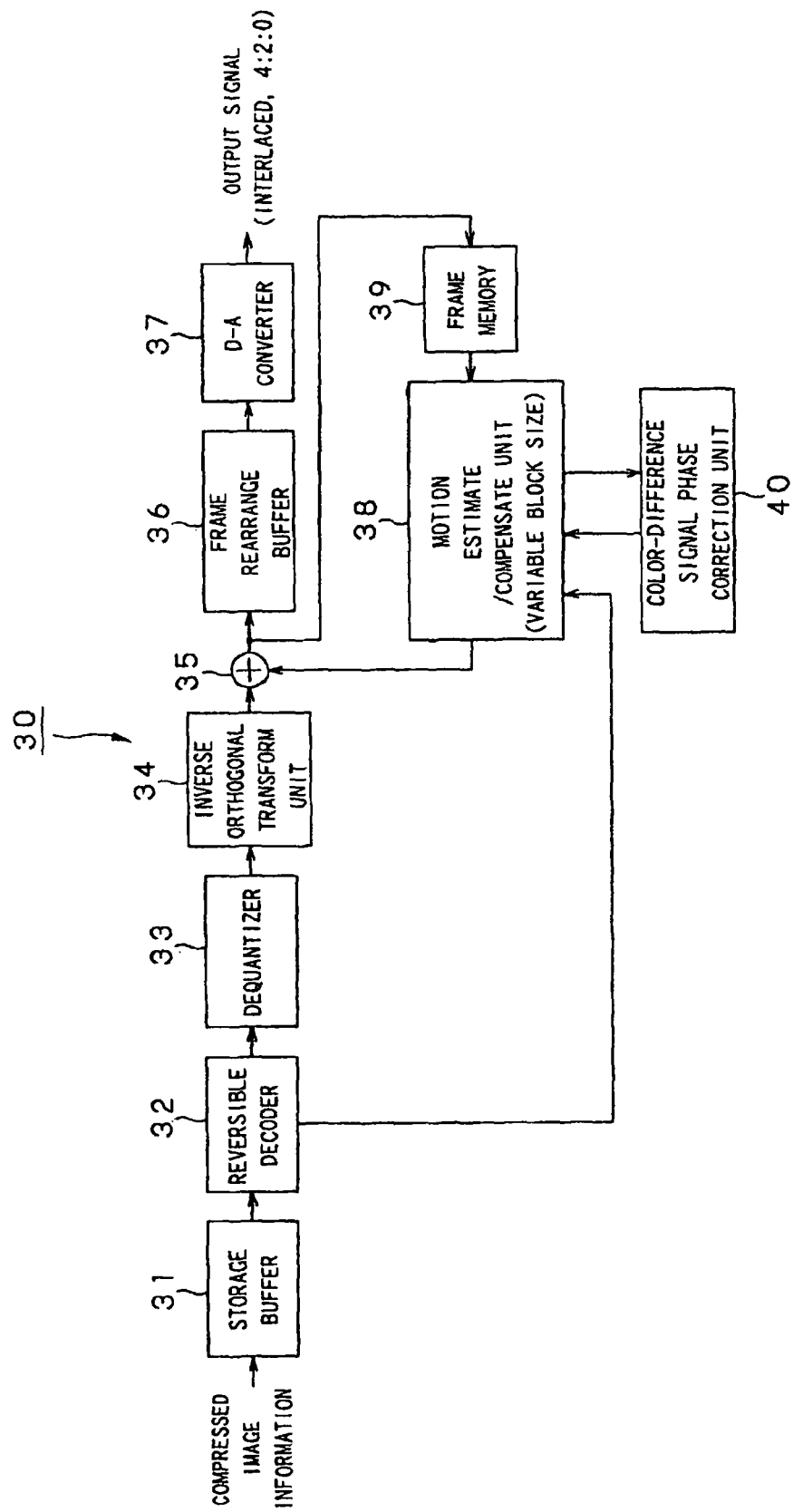
FIG. 11 schematically illustrates the construction of an image information decoder according to the present invention.

FIG. 11 schematically illustrates the image information decoder according to the present invention. The image information decoder is generally indicated with a reference 30. As shown in FIG. 11, the image information decoder 30 includes a storage buffer 31, reversible decoder 32, dequantizer 33, inverse orthogonal transform unit 34, adder 35, frame rearrange buffer 36, D-A converter 37, motion estimate/compensate unit 38 (variable block size), frame memory 39, and a color-difference signal phase correction unit 40.

As shown in FIG. 11, the storage buffer 31 provisionally stores input compressed image information, and then transfers it to the reversible decoder 32. The reversible decoder 32 makes variable-length decoding or arithmetic decoding of the compressed image information on the basis of a predetermined compressed image information format, and supplies the quantized conversion factor to the dequantizer 33. Also, when the frame is a one having been inter-frame encoded, the reversible decoder 32 will decode motion vector information inserted in a header of the compressed image information as well and supplies the information to the motion estimate/compensate unit (variable block size) 38.

The dequantizer 33 dequantizes the quantized conversion factor supplied from the reversible decoder 32, and supplies the conversion factor to the inverse orthogonal transform unit 34. The inverse orthogonal transform unit 34 will make inverse discrete cosine transform (inverse DCT) or inverse orthogonal transform such as inverse Karhunen-Loeve transform (inverse KLT) of the conversion factor on the basis of the predetermined compressed image information format.

Note that in case the frame is a one having been intra-frame encoded, the inverse orthogonal transform unit 34 will supply the inversely orthogonal-transformed image information to the frame rearrange buffer 36. The frame rearrange buffer 36 will provisionally store the supplied image information, and then supply it to the D-A converter 37. The D-A converter 37 makes D-A conversion of the image information and outputs the data.

On the other hand, in case the frame is a one having been inter-framed encoded, the motion estimation/compensation unit (variable block size) 38 will generate a reference image while correcting the phase of the color-difference signal in the color-difference signal phase correction block 40 on the basis of the motion vector information having been reversibly decoded and image information stored in the frame memory 39 as will further be described later. The adder 35 combines the reference image and output from the inverse orthogonal transform unit 34 with each other. It should be noted that the other processes are the same as for the intra-frame coded frame and so will not be described any longer.

As described above, in the image information encoder 10 and image information decoder 30, as the embodiments of the present invention, the phase shift of the color-difference signal, caused by the motion estimation and compensation, is corrected in their respective color-difference signal phase correction units 22 and 40. How to correct such phase shift will be described herebelow. It should be noted that the color-difference signal phase correction unit 22 is identical in theory of operation to that the color-difference signal phase correction unit 40 and so the following description of the theory of operation for the phase shift correction will be limited to the color-difference signal phase correction unit 22.

The color-difference signal phase correction unit 22 operates to correct a phase shift of a color-difference signal, caused by a motion estimation and compensation adaptively to a macro-block motion compensate/estimate mode and the value of a motion vector.

Figure 12:
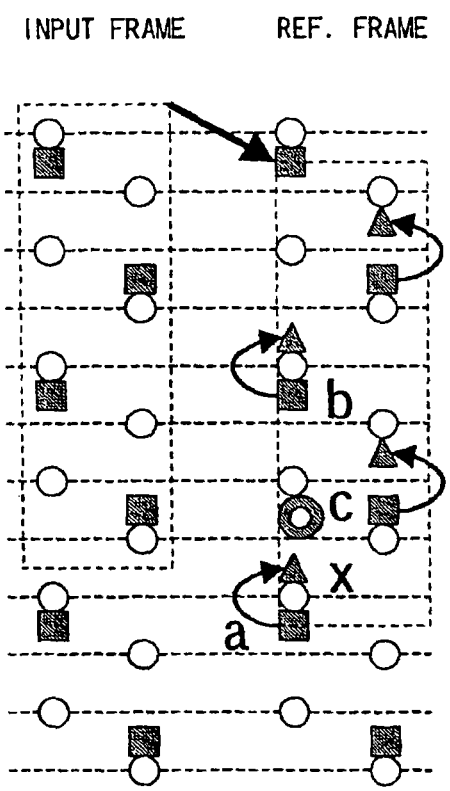
FIG. 12 explains the operation made in a color-difference signal phase correction unit when the macro block is in the frame motion estimate/compensate mode and the value of vertical component of motion vector information is 1.0.

First, when the vertical component in motion vector information is 4n+1:0 (n is an integer), the color-difference signal phase correction unit 22 will function as will be described with reference to FIG. 12 showing the operation made in the color-difference signal phase correction unit 22 when the value of vertical component in motion vector information is +1.0, for example. It should be noted that in FIG. 12, a circle indicates a brightness signal and a square indicates a color-difference signal.

As will be seen from FIG. 12, for putting the color-difference signals of an input frame and reference frame into phase with each other, the color-difference signal in the reference frame should be in a phase indicated with a triangle. However, the color difference signal of the reference signal stored in the frame memory 20 is in the phase indicated with the square. Therefore, there arises a phase shift between the color-difference signals of the input and reference frames, causing the degradation of image quality.

In this case, the color-difference signal phase correction unit 22 will shift the color-difference signal in the reference frame by $-\frac{1}{4}$ phase in units of a field from the phase indicated with the square to the phase indicated with the triangle on the assumption that the sampling period of the color-difference signal is one phase.

Next, there will be described an operation made in the color-difference signal phase correction unit 22 when the vertical component in motion vector information is 4n+2.0 (n is an integer). For this example, FIG. T3 shows the operation made in the color-difference signal phase correction unit 22 when the value of vertical component in motion vector information is +2.0.

Figure 13:
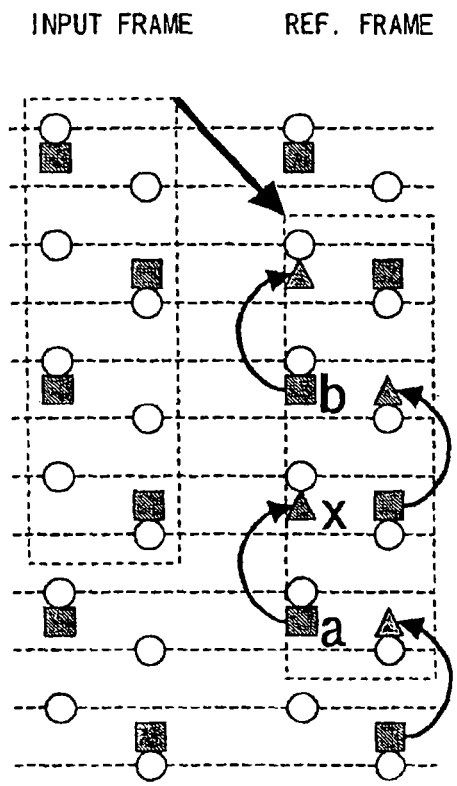
FIG. 13 explains the operation made in the color-difference signal phase correction unit when the macro block is in the frame motion estimate/compensate mode and the value of vertical component of motion vector information is 2.0.

As seen from FIG. 13, a phase shift arises between the color-difference signals in the input and reference frames as in the case shown in FIG. 12. In this case, the color-difference signal phase correction unit 22 will shift the color-difference signal in the reference frame by $-\frac{1}{2}$ phase in units of a field from the phase indicated with the square to the phase indicated with the triangle on the assumption that the sampling period of the color-difference signal ss one phase.

Next, there will be described an operation made in the color-difference signal phase correction unit 22 when the vertical component in motion vector information is 4n+3.0 (n is an integer). For this example, FIG. 14 shows the operation made in the color-difference signal phase correction unit 22 when the value of vertical component in motion vector information is +3.0.

Figure 14:
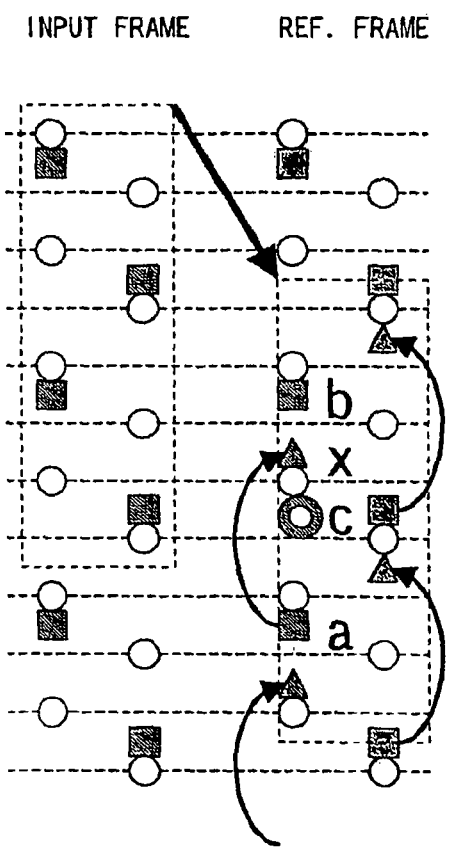
FIG. 14 explains the operation made in the color-difference signal phase correction unit when the macro block is in the frame motion estimate/compensate mode and the value of vertical component of motion vector information is 3.0.

As seen from FIG. 14, a phase shift arises between the color-difference signals in the input and reference frames as in the cases shown in FIGS. 12 and 13. In this case, the color-difference signal phase correction unit 22 will shift the color-difference signal in the reference frame by $-\frac{3}{4}$ phase in units of a field from the phase indicated with the square to the phase indicated with the triangle on the assumption that the sampling period of the color-difference signal is one phase.

Note that the above cases are identical to each other in that the color-difference signal is phase-shifted in units of a field and this phase shifting may be done by linear interpolation or using an FIR filter with several taps. Alternately, there may be prepared a factor for generating, with one operation, pixels corresponding to a phase indicated with a motion vector whose operation made in is smaller than an integer pixel value on the basis of a color-difference pixel corresponding to a phase indicated with a motion vector having an integer pixel value and the shifting operations be done all at once by applying the factor to input pixels. This will be described in further detail below.

For example, in the case shown in FIG. 12, a pixel value X of a color-difference signal may be generated using the following equation (3) in linear interpolation:

$$X=(3a+b)/4 \qquad (3).$$

Figure 1:
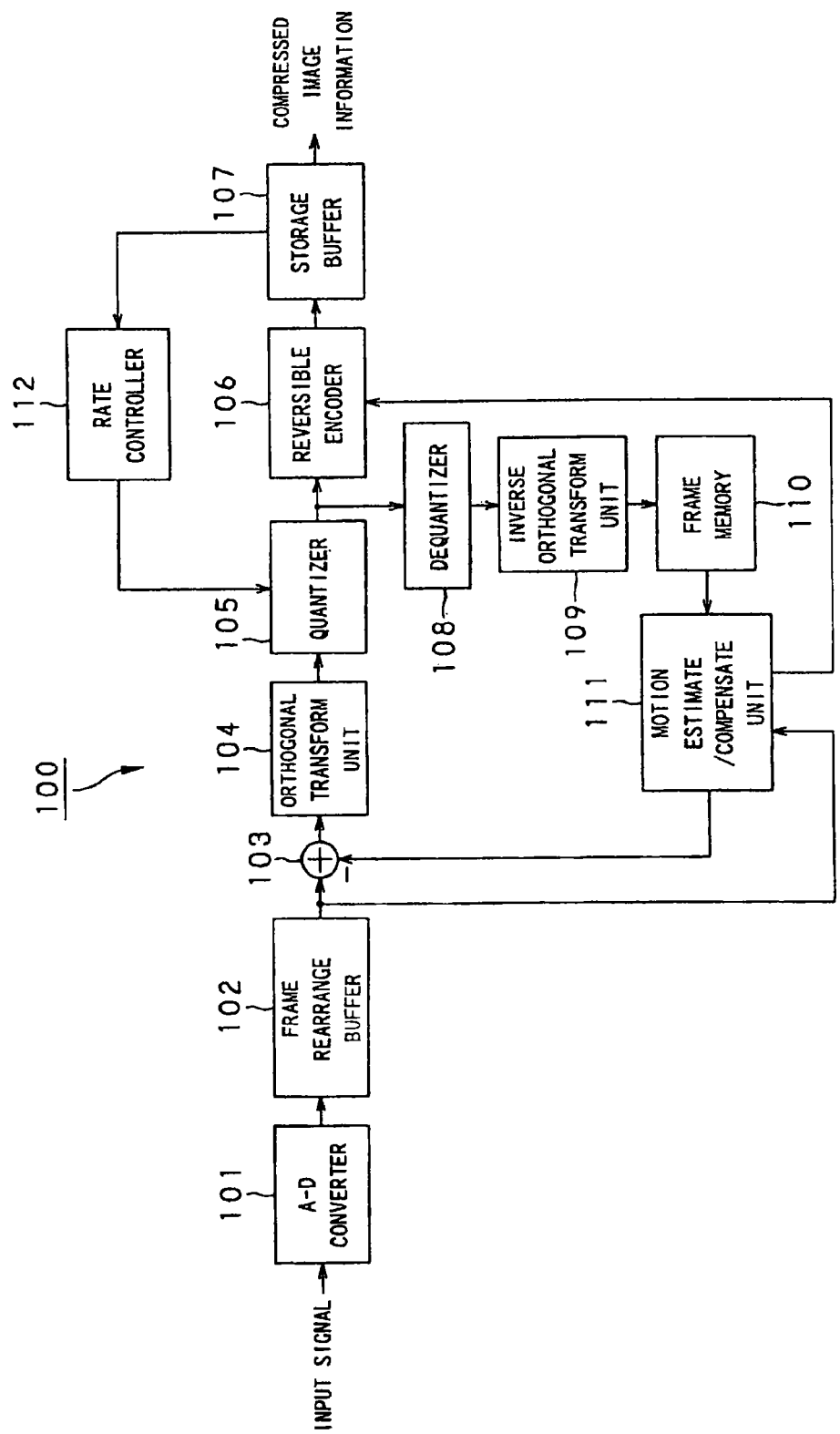
FIG. 1 schematically illustrates the construction of the conventional image information encoder for compression-encoding of an image by an orthogonal transform and motion compensation.
Figure 2:
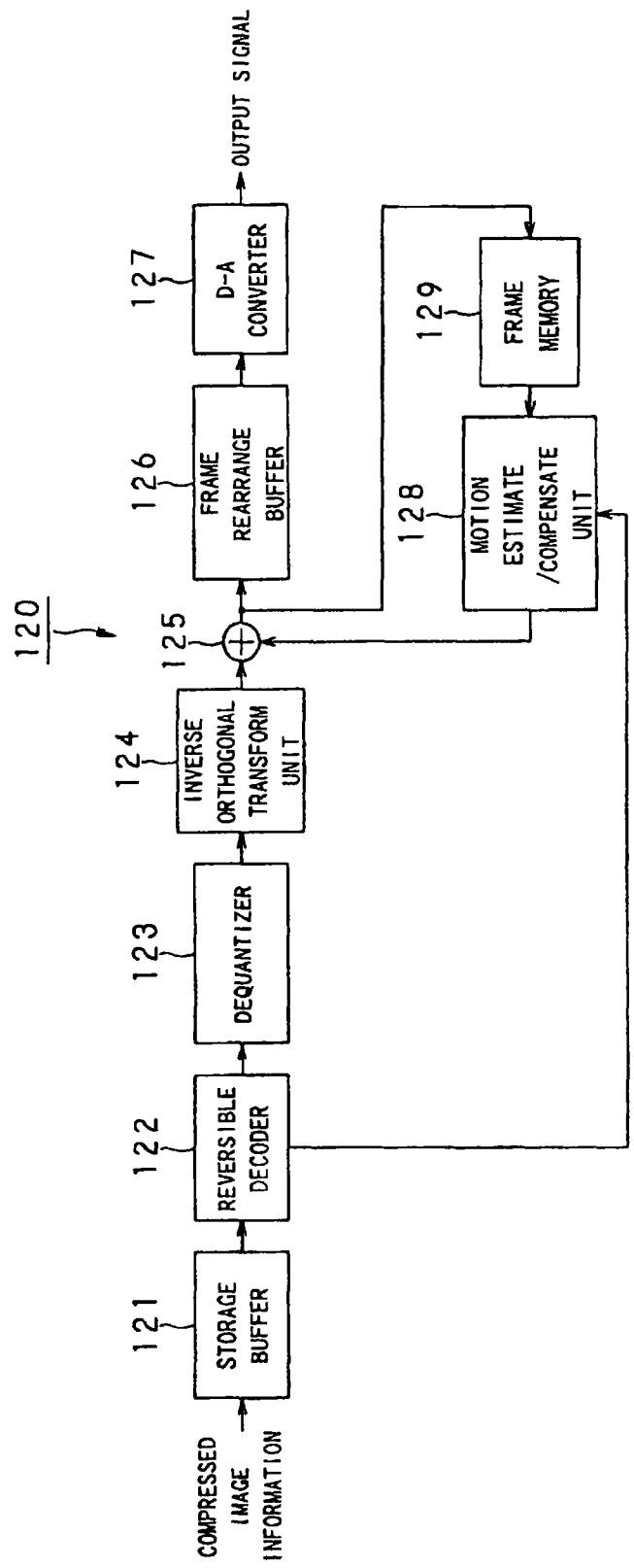
FIG. 2 schematically illustrates the construction of the conventional image information decoder for decoding image information compressed through the orthogonal transform and motion compression.
Figure 3:
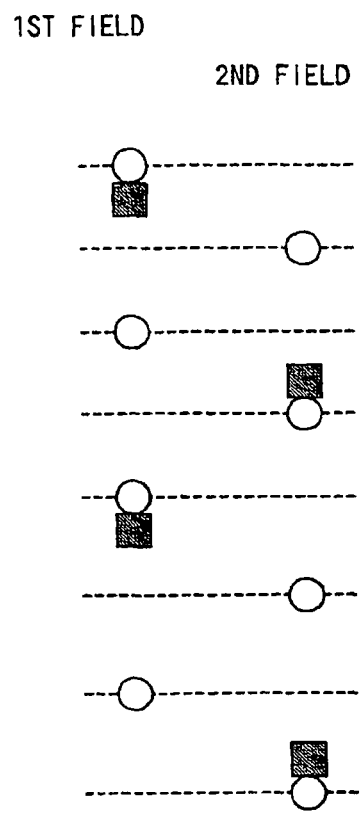
FIG. 3 explains the phase relation between a brightness signal and color-difference signal when an input image signal is an interlaced image in the format of 4:2:0.
Figure 4:
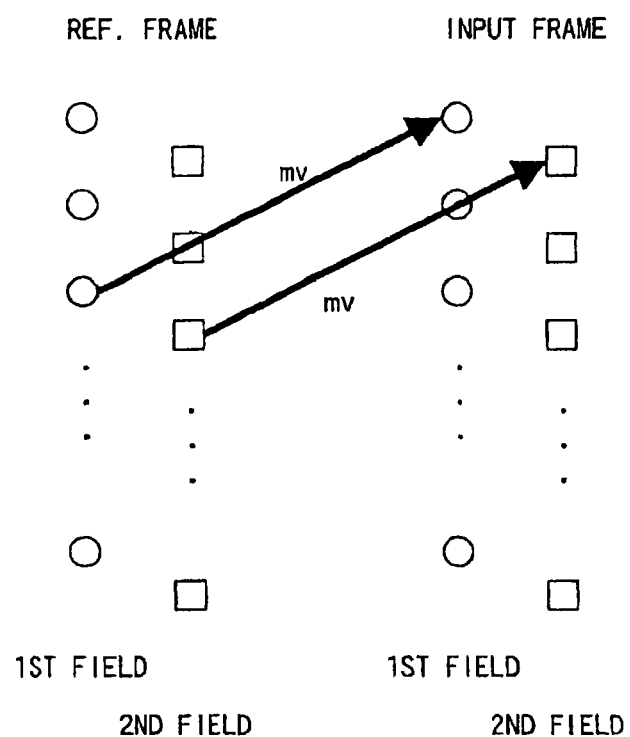
FIG. 4 explains the frame motion estimate/compensate mode defined in MPEG-2.
Figure 5:
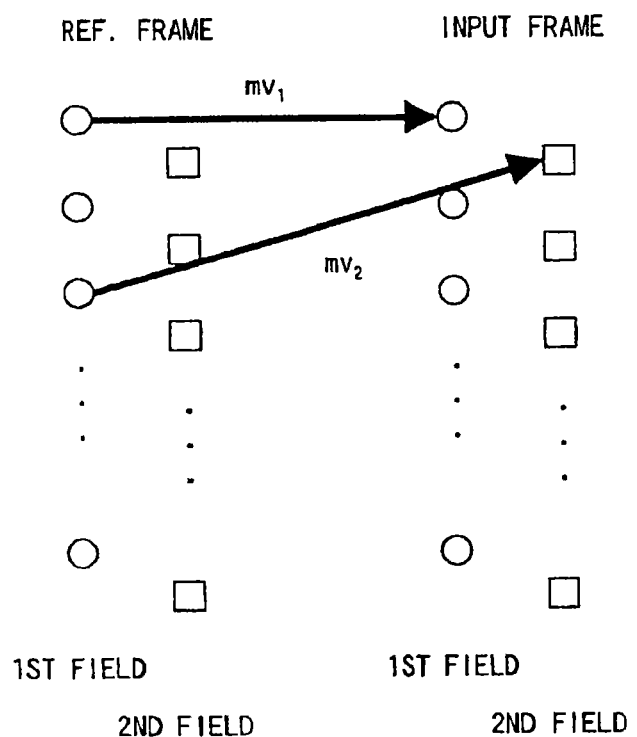
FIG. 5 explains the field motion estimate/compensate mode defined in MPEG-2.
Figure 6:
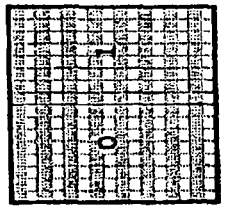
FIG. 6 explains twelve possible block sizes defined in "Core Experiment on Interlaced Video Coding" (VCEG-N85, ITU-T) and that an input interlaced image, if any, takes.
Figure 7:
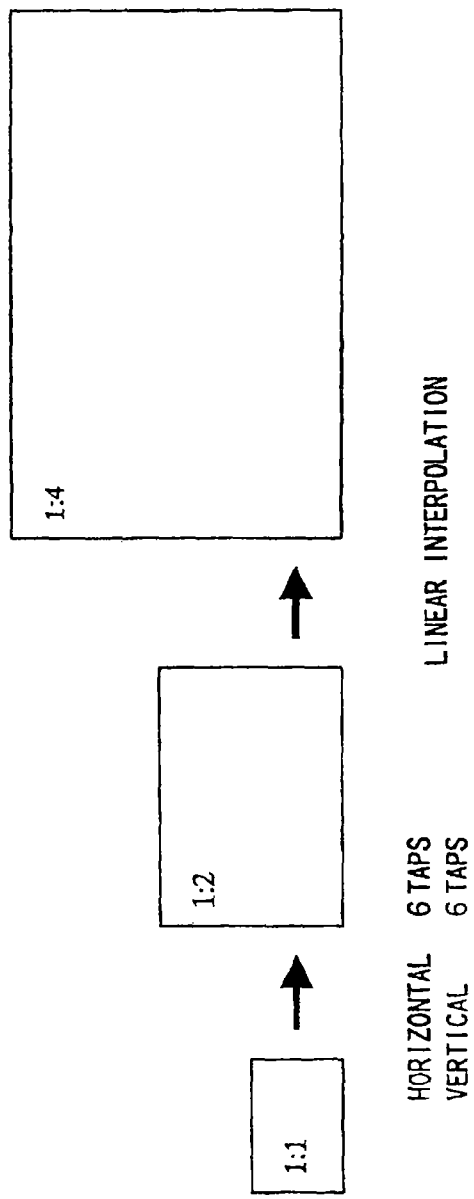
FIG. 7 explains the ¼-pixel accuracy motion estimation/compensation defined in H.26L.
Figure 8:
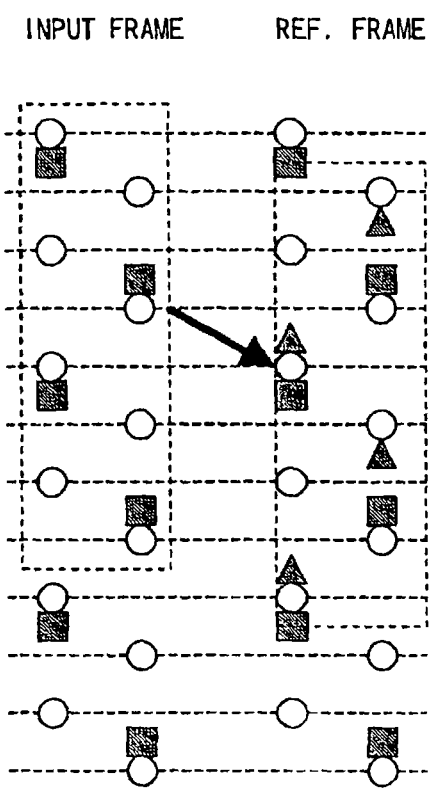
FIG. 8 explains the phase relation between a brightness signal and color-difference signal in MPEG-2-compressed image information when the macro block is in the frame motion estimate/compensate mode and the value of vertical component in motion vector is 1.0.
Figure 9:
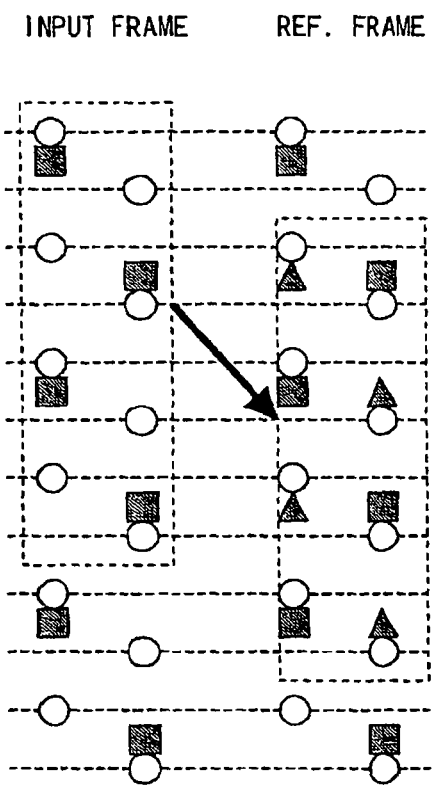
FIG. 9 explains the phase relation between a brightness signal and color-difference signal in MPEG-2-compressed image information when the macro block is in the frame motion estimate/compensate mode and the value of vertical component in motion vector is 2.0.

Also, the pixel value X may be generated by the aforementioned method shown in FIG. 7. That is, a pixel value corresponding to a phase indicated with a reference "c" in FIG. 12 may first be generated using a 6-tap FIR filter defined by the equation (1) in intra-field interpolation, and the color-difference signal pixel value X be generated using the following equation (4) correspondingly to the phase indicated with the reference "c":

$$x=(a+c)/2 \qquad (4)$$

Further, a filter factor corresponding to a series of operations may be prepared, and the color-difference signal pixel value X may be generated from a pixel value corresponding to a phase indicated with a reference "a" and a pixel value corresponding to a phase indicated with a reference "b" by a one-stage filtering without generation of any pixel value corresponding to the phase indicated with the reference "c".

Furthermore, the color-difference signal pixel value X may be generated using the FIR filter factor given by the following expression (5):

$$\{-3,12,-37,229,71,-21,6,-1\}/256 \qquad (5)$$

In the case shown in FIG. 13, the color-difference signal pixel value X may be generated using the following equation (6) in linear interpolation:

$$x=(a+b)/2 \qquad (6)$$

Also, the color-difference signal pixel value X may be generated using the 6-tap FIR filter defined by the equation (1).

Further, the color-difference signal pixel value X may be generated using an FIR filter factor given by the following expression (7):

$$\{-3,12,-37,229,71,-21,6,-3\}/256 \qquad (7)$$

In the case shown in FIG. 14, the color-difference signal pixel value X may be generated using the following equation (8) in linear interpolation:

$$X=(a+3b)12 \qquad (8)$$

Also, the color-difference signal pixel value X may be generated by the method having previously been described with reference to FIG. 7. That is, a pixel value corresponding to a phase indicated with a reference "c" in FIG. 14 may first be generated using a 6-tap FIR filter defined by the equation (1) in intra-field interpolation, and the color-difference signal pixel value X be generated using the following equation (9) correspondingly to the phase indicated with the reference "c":

$$x=(b+c)/2 \qquad (9)$$

Further, the color-difference signal pixel value X may be generated using an FIR filter factor given by the following expression (10):

$$\{-1,6,-21,71,229,-37,12,-3\}/256 \qquad (10)$$

Figure 15:
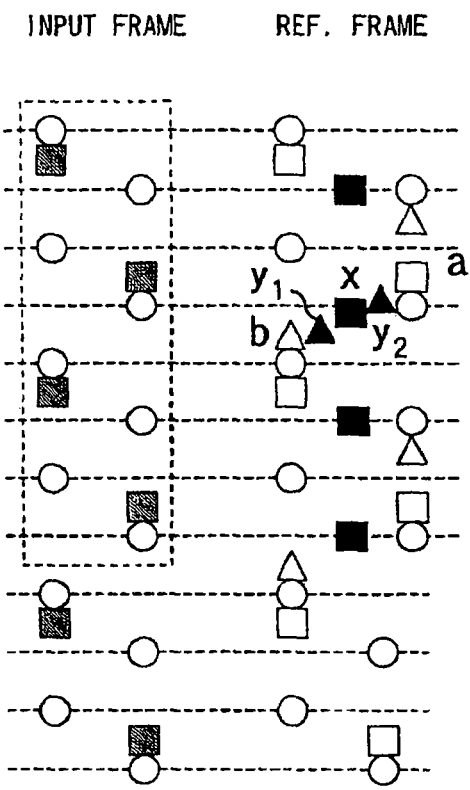
FIG. 15 explains the operation made in the color-difference signal phase correction unit when the macro block is in the frame motion estimate/compensate mode and the vertical component of motion vector information has an operation made in of smaller than the integer pixel value.

Next, when the macro-block motion estimation/compensate mode is the frame motion compensate/estimate mode and the vertical component in motion vector information has an operation made in smaller than an integer pixel value, the color-difference signal phase correction unit 22 functions as will be described with reference to FIG. 15. In FIG. 15, a blank square indicate the phase of color-difference signal when the vertical component in motion vector information is 0.0, blank triangle indicates the phase of color-difference signal when the vertical component in motion vector information is 1.0.

In the above case, the color-difference signal phase correction unit 22 generates a color-difference signal pixel value K for a vertical component 0.5 of the motion vector information on the basis of a pixel value corresponding to a phase indicated with a reference "a" and a pixel value corresponding to a phase indicated with a reference "b". It should be noted that the reference "a" indicates a phase of a color-difference signal stored in the frame memory and the reference "b" indicates a phase of a color-difference signal generated with the operation shown in FIG. 14.

Also, there may be generated not only the pixel value K having a phase of a ½-pixel accuracy but also color-difference signal pixel values having a phase of a ¼-pixel accuracy and given by $y_1$ and $y_2$, respectively, in FIG. 15.

More specifically, color-difference signal pixel values x, $y_1$ and $y_2$ can be generated using the following equations (11) to (13) in linear interpolation:

$$x=(a+b)/2 \qquad (11)$$

$$y_1=(a+3b)/4 \qquad (12)$$

$$y_2=(3a+b)/4 \qquad (13)$$

Also, a color-difference signal pixel value K may be generated by inter-field interpolation using an FIR filter given by the aforementioned equation (1), and the pixel values $y_1$ and $y_2$ be generated as given by the following equations (14) and (15):

$$y_1=(x+b)/2 \qquad (14)$$

$$y_2=(x+a)/2 \qquad (15)$$

Further, the color-difference signal pixel values x, $y_1$ and $y_2$ may be generated using an FIR filter factor given by the following expression (16):

$$\{-3,12,-37,229,71,-21,6,-1\}/256$$

$$\{-3,12,-39,158,158,-39,12,-3\}/256$$

$$\{-1,6,-21,71,229,-37,12,-3\}/256 \qquad (16)$$

Next, when the macro block is in the field estimate mode, the color-difference signal phase correction unit 22 functions as will be described below with reference to FIGS. 16 to 23. It should be noted that the operation of color-difference signal phase correction unit 22 will be described with respect to each of three ranges 0 to 2 of the vertical component my of motion vector information but the explanation will also true for any other ranges. Also, FIGS. 16 to 23 cover a ¼-pixel accuracy but the accuracy may be extended to a ⅛-pixel or higher accuracy.

Figure 16:
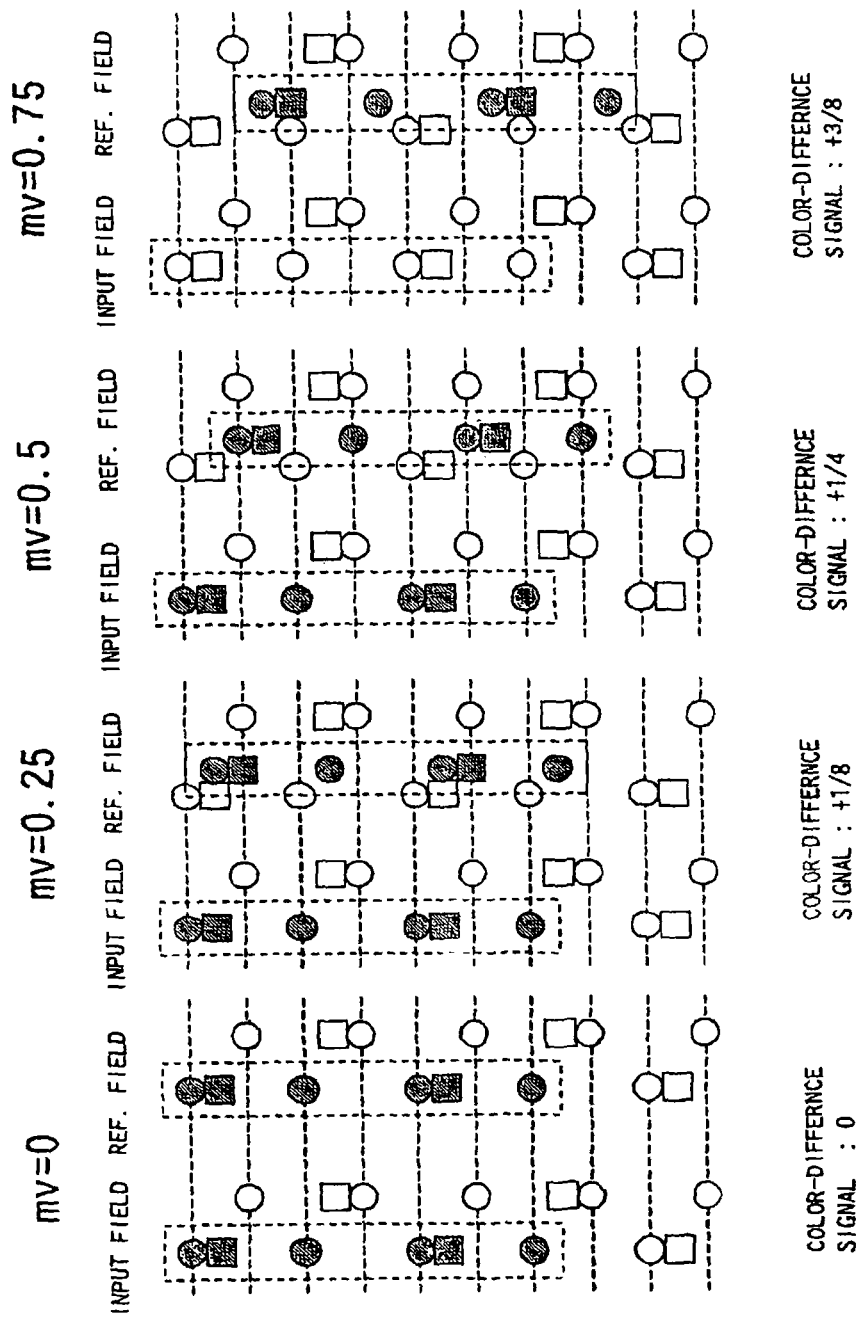
FIG. 16 explains the operation made in the color-difference signal phase correction unit when producing a predicted picture of a first field with reference to the first field with the macro block being in the field motion estimate mode and the value of vertical component of motion vector information being 0 to 0.75.
Figure 17:
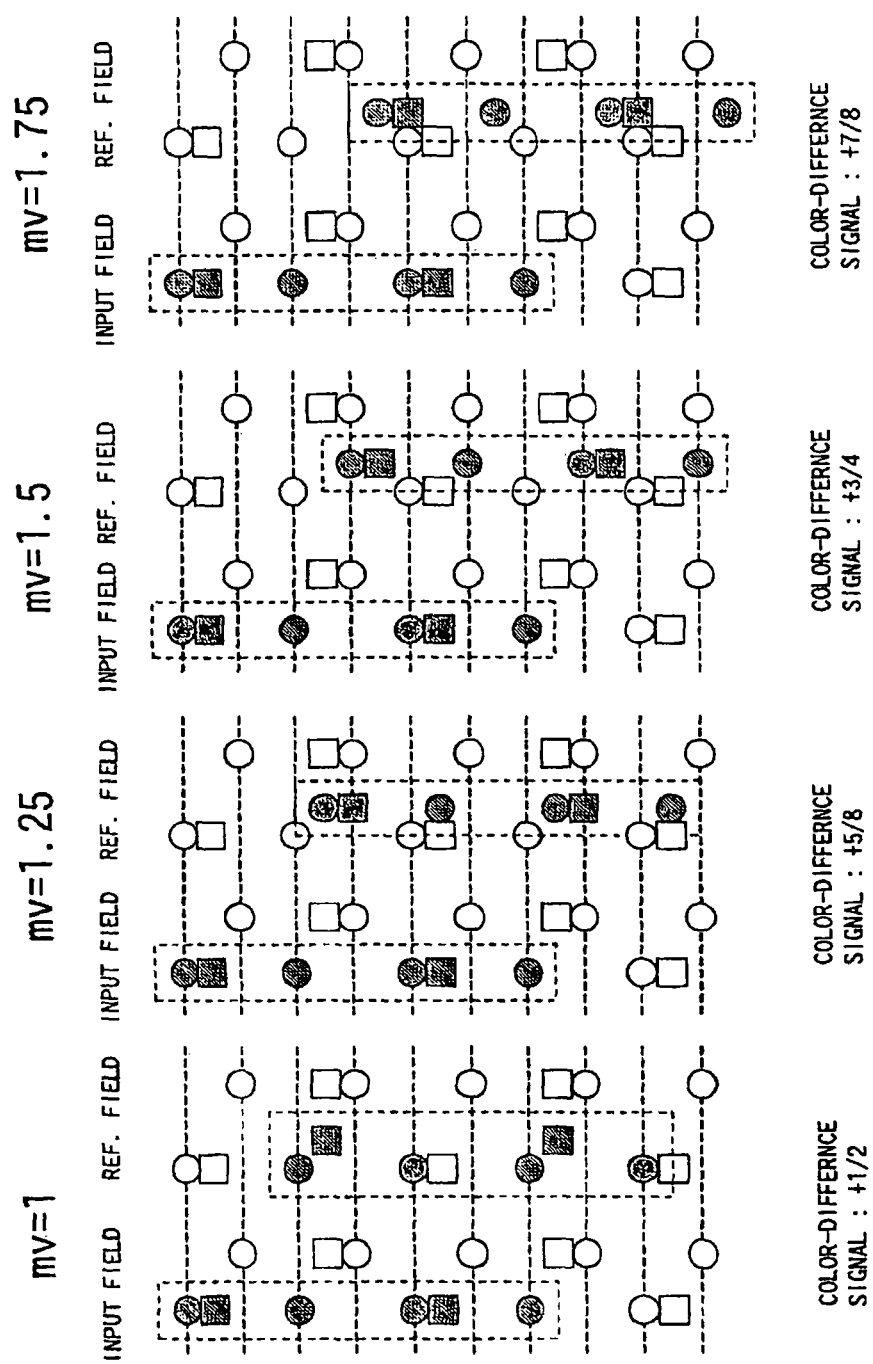
FIG. 17 explains the operation made in the color-difference signal phase correction unit when producing a predicted picture of the first field with reference to the first field with the macro block being in the field motion estimate mode and the value of vertical component in motion vector information being 1 to 1.75.

As a first example, a predicted picture of a first field is produced with reference to the first field as shown in FIGS. 16 and 17. FIG. 16 shows a case in which the value my of vertical component in motion vector information is 0 to 0.75, and FIG. 17 shows a case in which the value my of vertical component in motion vector information is 1 to 1.75.

As will be seen from FIGS. 16 and 17, a phase shift of mv/2 has to be made of the color-difference signal in both these cases.

Figure 18:
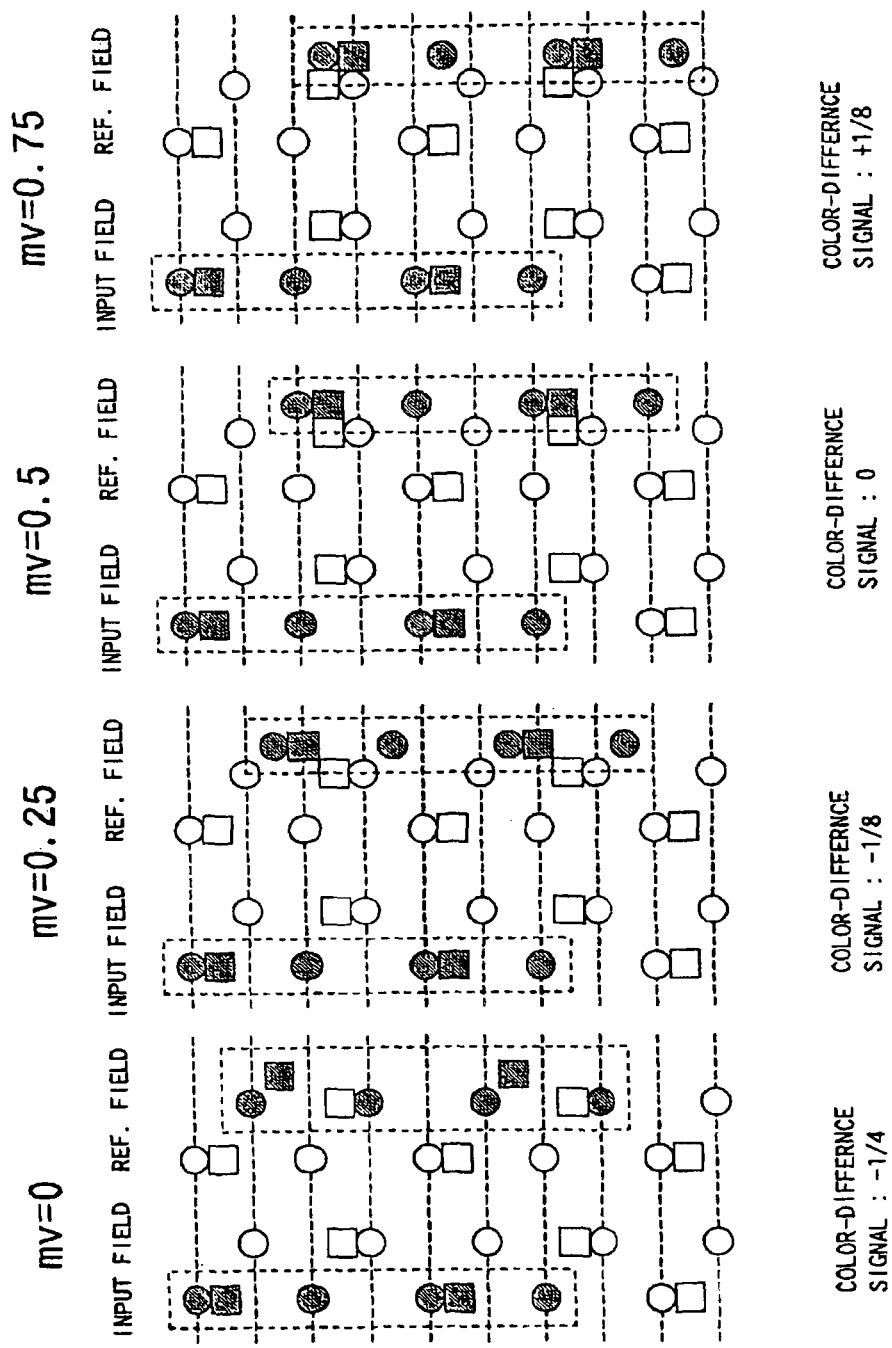
FIG. 18 explains the operation made in the color-difference signal phase correction unit when producing a predicted picture of a second field with reference to the second field with the macro block being in the field motion estimate mode and the value of vertical component in motion vector information being 0 to 0.75.
Figure 19:
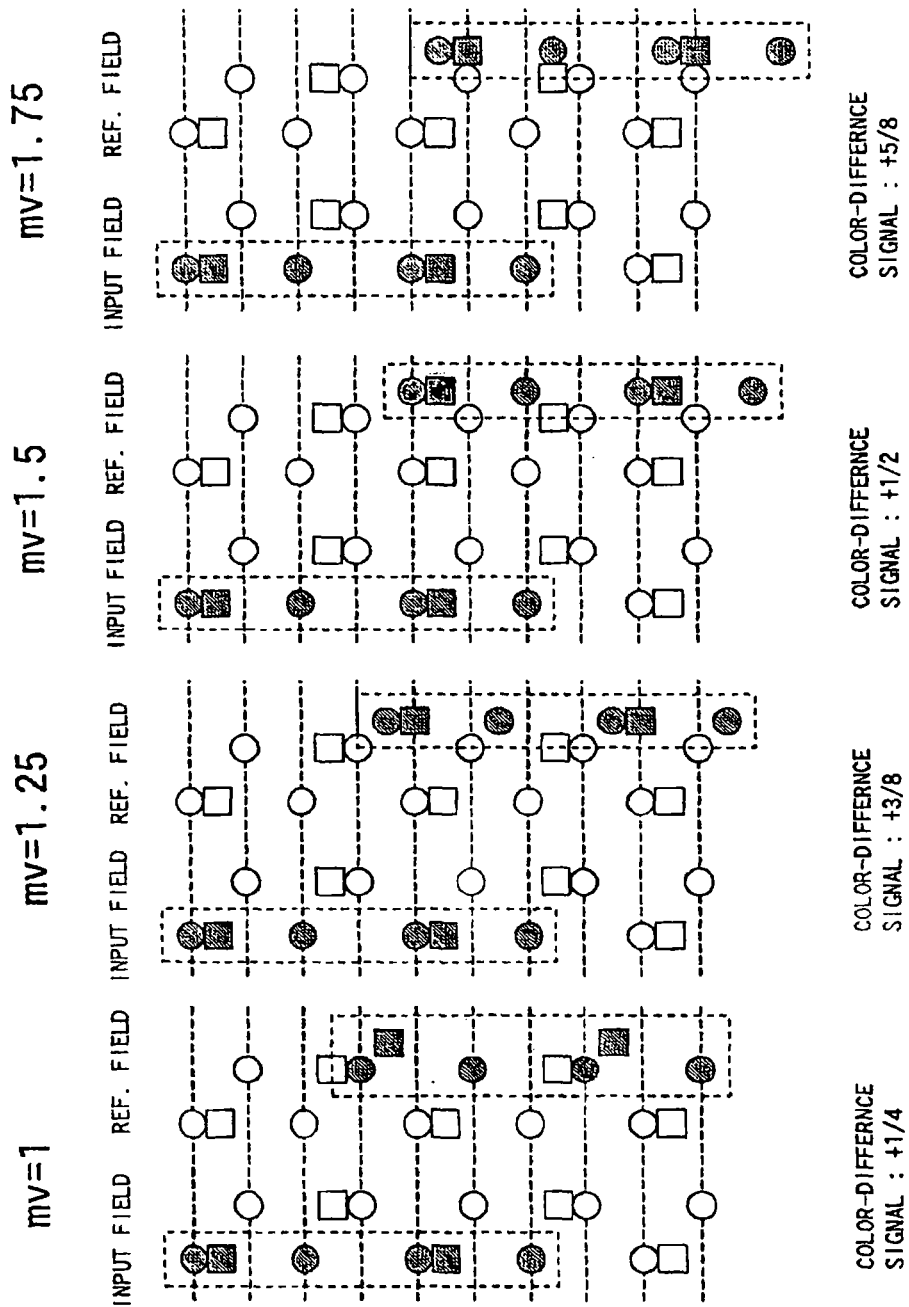
FIG. 19 explains the operation made in the color-difference signal phase correction unit when producing a predicted picture of the second field with reference to the second field with the macro block being in the field motion estimate mode and the value of vertical component in motion vector information being 1 to 1.75.

As a second example, a predicted picture of the first field is produced with reference to a second field as shown in FIGS. 18 and 19. FIG. 18 shows a case in which the value my of vertical component in motion vector information is 0 to 0.75, and FIG. 19 shows a case in which the value my of vertical component in motion vector information is 1 to 1.75.

As will be seen from FIGS. 18 and 19, a phase shift of (mv/2−¼) has to be made of the color-difference signal in both these cases. For example, in case mv=0.25, the color-difference signal should be phase-shifted by +⅛ (=0.25*½−¼).

Figure 20:
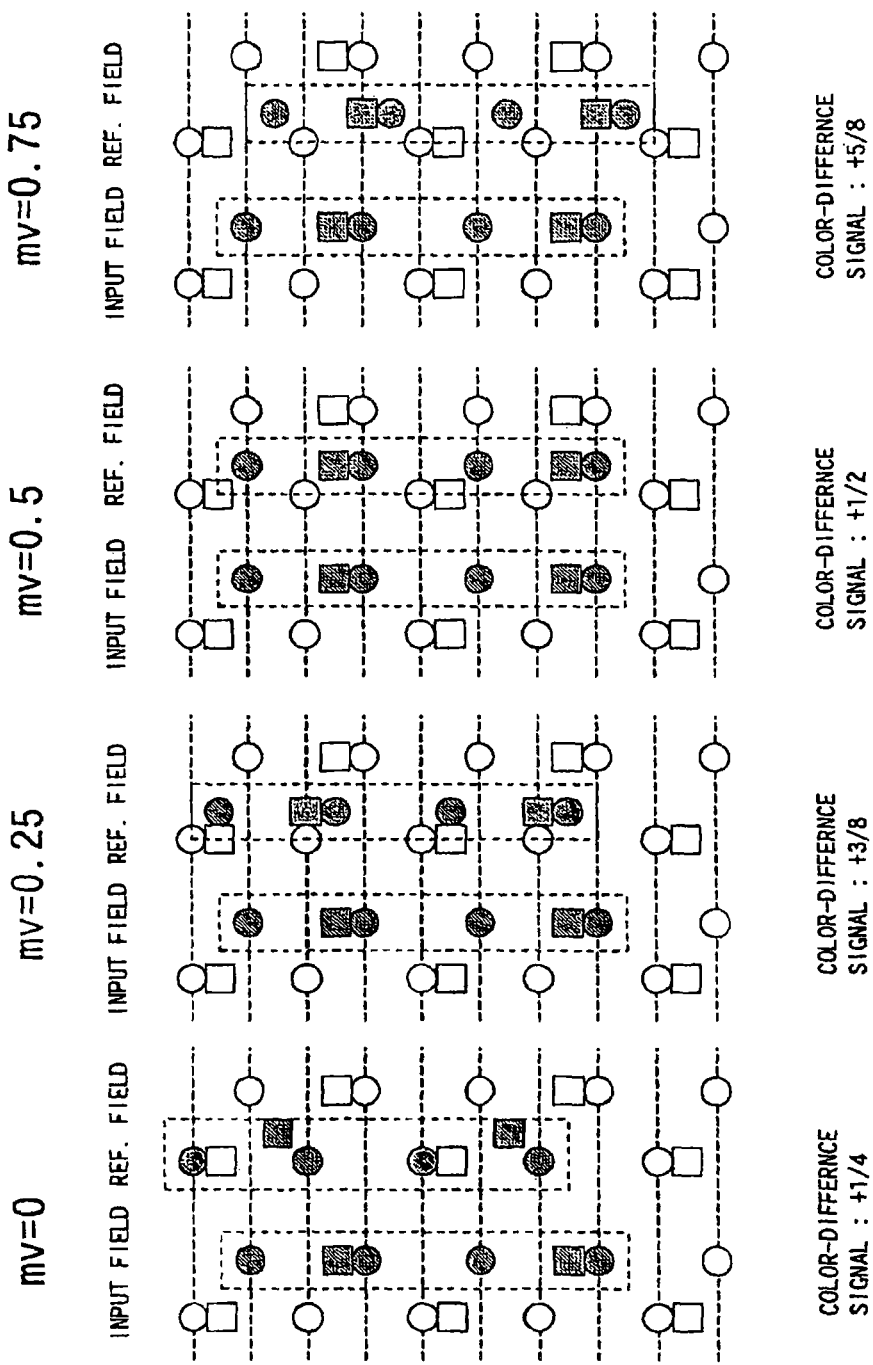
FIG. 20 explains the operation made in the color-difference signal phase correction unit when producing a predicted picture of the second field with reference to the first field with the macro block being in the field motion estimate mode and the value of vertical component in motion vector information being 0 to 0.75.
Figure 21:
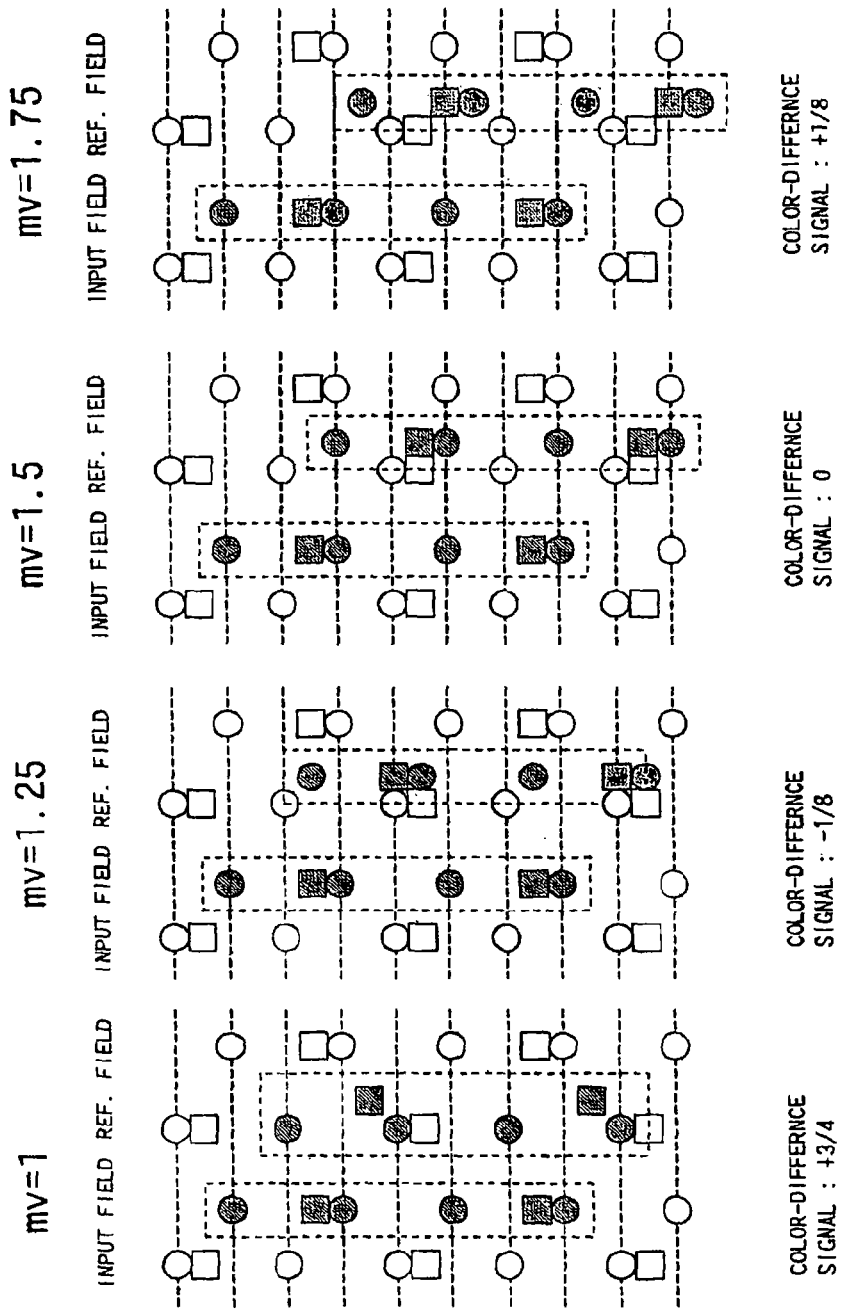
FIG. 21 explains the operation made in the color-difference signal phase correction unit when producing a predicted picture of the second field with reference to the first field with the macro block being in the field motion estimate mode and the value of vertical component in motion vector information being 1 to 1.75.

As a third example, a predicted picture of the second field is produced with reference to the first field as shown in FIGS. 20 and 21. FIG. 20 shows a case in which the value my of vertical component in motion vector information is 0 to 0.75, and FIG. 21 shows a case in which the value of vertical component in motion vector information is 1 to 1.75.

As will) be seen from FIGS. 20 and 21, a phase shift of (mv/2+¼) has to be made of the color-difference signal in both these cases. For example, in case mv=0.25, the color-difference signal should be phase-shifted by +⅜ (=0.25*½+¼).

Figure 22:
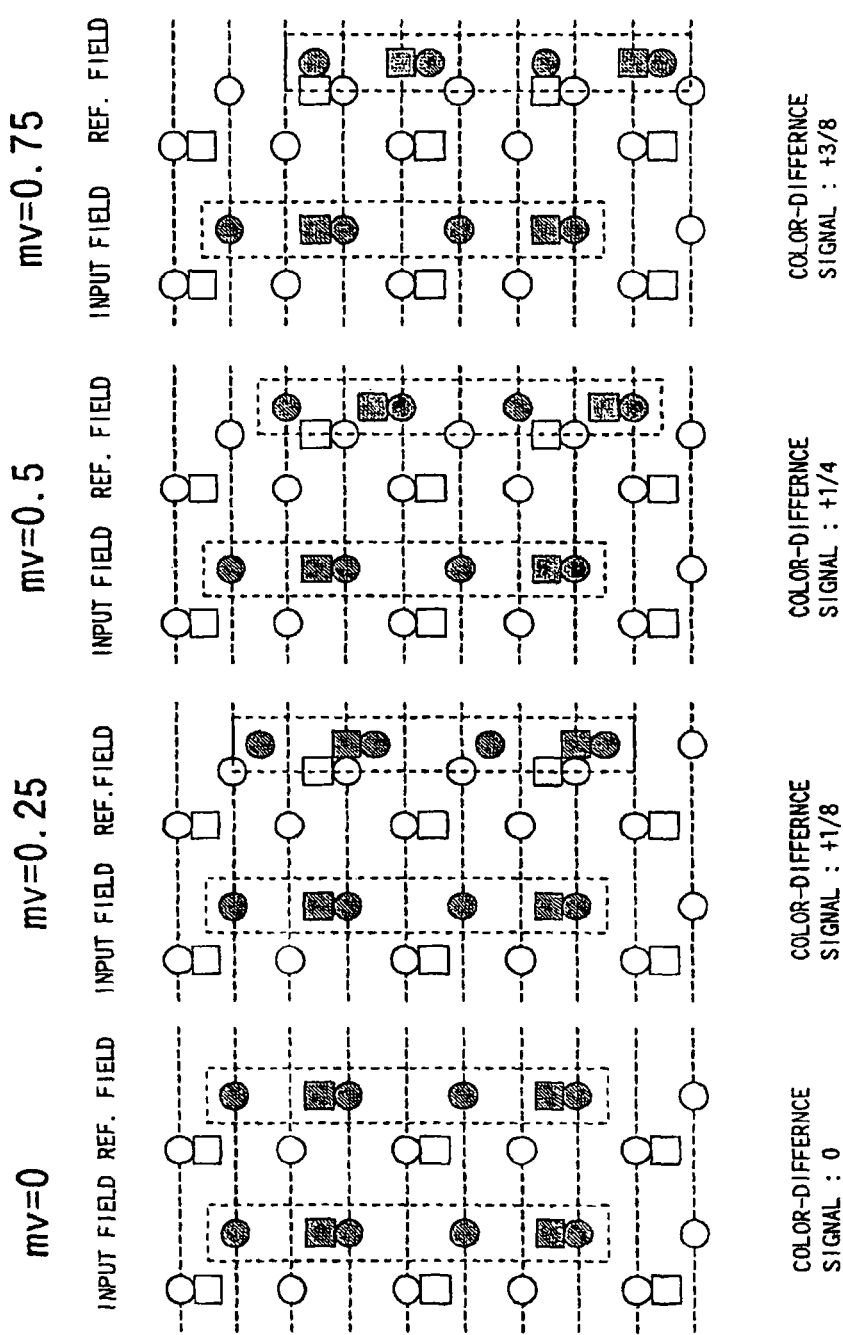
FIG. 22 explains the operation made in the color-difference signal phase correction unit when producing a predicted picture of the second field with reference to the second field with the macro block being in the field motion estimate mode and the value of vertical component in motion vector information being 0 to 0.75.
Figure 23:
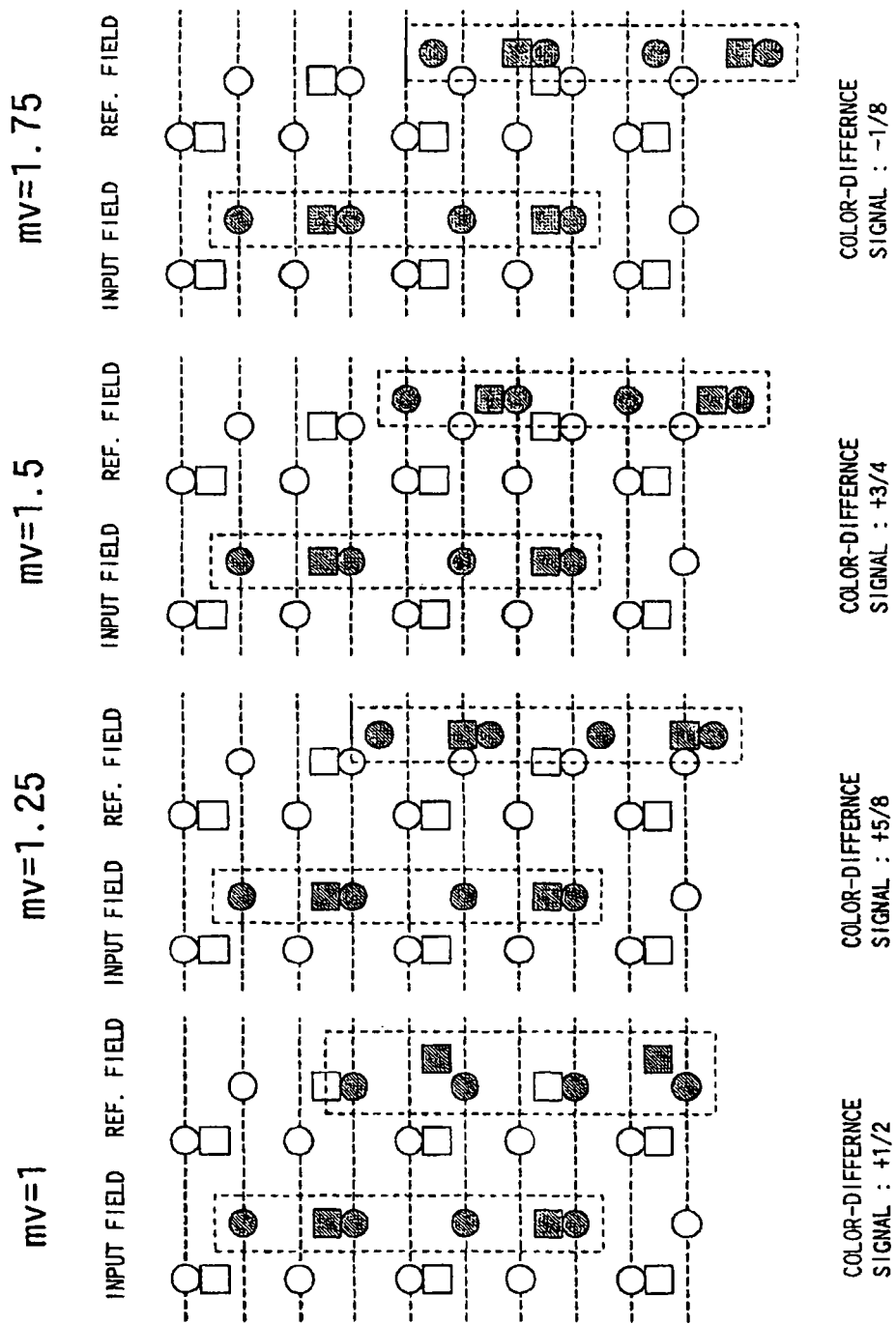
FIG. 23 explains the operation made in the color-difference signal phase correction unit when producing a predicted picture of the second field with reference to the second field with the macro block being in the field motion estimate mode and the value of vertical component in motion vector information being 1 to 1.75.

As a final example, a predicted picture of the second field is produced with reference to the second field as shown in FIGS. 22 and 23. FIG. 22 shows a case in which the value my of vertical component in motion vector information is 0 to 0.75, and FIG. 23 shows a case in which the value my of vertical component in motion vector information is 1 to 1.75. As will be seen from FIGS. 22 and 23, a phase shift of mv/2 has to be made of the color-difference signal in both these cases.

That is, in case the reference field is different from the input field, the color-difference signal has to be phase-shifted differently from the brightness signal. For example, in case a predicted picture of the first field is produced with reference to the second field, the color-difference signal should be phase-shifted by −¼ phase. For production of a predicted picture of the second field with reference to the first field, the phase should be shifted by +¼ phase.

Note that in any case, the phase shift is made by intra-field interpolation such as linear interpolation or using the FIR filter with six taps. It should also be noted that as the FIR filter factor, there may be used a factor obtained by calculating the aforementioned equation (2) correspondingly to the phase of an output color-difference signal.

As having been described in the foregoing, in the image information encoder 10 for compressing an interlaced image formed in the 4:2:0 format and the image information decoder 30 for decoding the compressed image information, both as the embodiments of the present invention, the vertical phase of a color-difference signal is shifted adaptively to a value of the vertical component in motion vector information and a selected motion estimate mode, whereby it is possible to prevent the image from being degraded in quality by a phase shift of the color-difference signal.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

INDUSTRIAL APPLICABILITY

According to the present invention, for the motion estimation/compensation, the color-difference signal in the reference image block is so phase-shifted adaptively 10 a selected motion estimate mode and the value my of vertical component in motion vector information so that the reference image block will be in phase of the color-difference signal with the input image block, thereby enabling to avoid a degradation in image quality of the color-difference signal, caused by color-difference signals being out of phase with respect to each other or a field reverse.

The invention claimed is:

1. An encoder comprising:
circuitry configured to:
    perform a motion compensation of an image signal including a luma signal and a chroma signal in a format in which a number of chroma pixels is vertically different from a number of luma pixels;
    detect a condition that a reference field has a different parity from a current field for a motion compensation;
    control, in the detected condition, the motion compensation so as to vertically shin a phase of the chroma signal in the reference field so that the reference field will coincide in phase of the chroma signal with the current field; and
    encode a difference signal between an image signal and a predictive image signal to generate encoded image data.

2. The encoder according to claim 1, wherein
the format is 4:2:0, and
the circuitry is configured to shift, when the reference field is a top field while the current field is a bottom field for motion compensation, the phase of the chroma signal in a reference image by mv/2+¼, where my is a vertical component in a luma motion vector of the luma signal.

3. The encoder according to claim 2, wherein the circuitry is configured to shift, when the current field is a top field while the reference field is a bottom field for motion compensation, the phase of the chroma signal in a reference image by mv/2−¼.

4. The encoder according to claim 3, wherein the circuitry is configured to:
receive mode information that identifies a current macro-block as a field macro-block, and
perform the motion compensation on the basis of the mode information.

5. An encoding method comprising:
performing a motion compensation of an image signal including a luma signal and a chroma signal in a format in which a number of chroma pixels is vertically different from a number of luma pixels;
detecting a condition that a reference field has a different parity from a current field for a motion compensation;
controlling, in the detected condition, the motion compensation so as to vertically shift a phase of the chroma signal in the reference field so that the reference field will coincide in phase of the chroma signal with a current field; and
encoding a difference signal between an image signal and a predictive image signal to generate encoded image data.

6. The encoding method according to claim 5, wherein
the format is 4:2:0, and
the controlling includes shifting, when the reference field is a top field while the current field is a bottom field for motion compensation, the phase of the chroma signal in a reference image by mv/2+¼, where my is a vertical component in a luma motion vector of the luma signal.

7. The encoding method according to claim 6, wherein the controlling includes shifting, when the current field is a top field while the reference field is a bottom field for motion compensation, the phase of the chroma signal in a reference image by my/2−¼.

8. The encoding method according to claim 7, further comprising:

receiving mode information that identifies a current macro-block as a field macro-block, wherein performing the motion compensation includes performing the motion compensation on the basis of the mode information.

9. An encoder comprising:

means for performing a motion compensation of an image signal including a luma signal and a chroma signal in a format in which a number of chroma pixels is vertically different from a number of luma pixels;

means for detecting a condition that a reference field has a different parity from a current field for a motion compensation;

means for controlling, in the detected condition, the motion compensation so as to vertically shift a phase of the chroma signal in the reference field so that the reference field will coincide in phase of the chroma signal with a current field; and means for encoding a difference signal between an image signal and a predictive image signal to generate encoded image data.

10. A non-transitory computer readable storage medium storing instructions which, when executed by a processor, cause the processor to perform a method comprising:

performing a motion compensation of an image signal including a luma signal and a chroma signal in a format in which a number of chroma pixels is vertically different from a number of luma pixels;

detecting a condition that a reference field has a different parity from a current field for a motion compensation;

controlling, in the detected condition, the motion compensation so as to vertically shift a phase of the chroma signal in the reference field so that the reference field will coincide in phase of the chroma signal with a current field; and encoding a difference signal between an image signal and a predictive image signal to generate encoded image data.

* * * * *